United States Patent [19]
Warren et al.

[11] Patent Number: 5,370,573
[45] Date of Patent: Dec. 6, 1994

[54] CHICKEN BREAST SLICING METHOD AND APPARATUS

[75] Inventors: Eugene Warren, Morton; Jack Hollingsworth; Jack Donald, Jr., Brandon; Willie Busby, Morton; Edward Aust; Lee Blackwell, III, both of Forest; John M. Rogers, Jr., Pearl; Everett D. Grissom, Brandon, all of Miss.

[73] Assignee: B. C. Rogers Poultry, Inc., Morton, Miss.

[21] Appl. No.: 67,093

[22] Filed: May 26, 1993

[51] Int. Cl.⁵ .............................................. A22C 21/00
[52] U.S. Cl. .................................. 452/149; 452/152; 452/155; 452/160; 452/170
[58] Field of Search ............... 452/149, 150, 151, 152, 452/155, 170, 160, 135, 125, 50

[56] References Cited

U.S. PATENT DOCUMENTS

| | | |
|---|---|---|
| 2,644,979 | 7/1953 | Ball ........................ 452/50 |
| 3,943,600 | 3/1976 | Cramer ................... 452/169 |
| 4,214,345 | 7/1980 | Duncan et al. ........ 452/149 |
| 4,236,275 | 12/1980 | Westerdahl ............ 452/135 |
| 4,503,587 | 3/1985 | Martin .................... 452/169 |
| 4,536,919 | 8/1985 | Cashwell et al. ...... 452/170 |
| 4,748,723 | 6/1988 | Braeger et al. ........ 452/162 |
| 4,831,240 | 5/1989 | Davis ...................... 219/539 |
| 4,849,232 | 7/1989 | Baker et al ............ 426/92 |
| 4,924,553 | 5/1990 | Grosseholz et al. ... 452/161 |
| 4,940,590 | 7/1990 | Williams et al. ...... 426/92 |
| 4,970,755 | 11/1990 | LeBlanc ................. 452/177 |
| 4,985,965 | 1/1991 | Leavitt ................... 452/162 |
| 5,026,572 | 6/1991 | Neiberger .............. 426/541 |
| 5,031,409 | 7/1991 | Johnson ................. 62/73 |
| 5,033,164 | 7/1991 | Miyazaki et al. ..... 452/161 |
| 5,069,914 | 12/1991 | Gagliardi, Jr. ........ 426/76 |
| 5,088,957 | 2/1992 | Gagliardi, Jr. ........ 452/149 |
| 5,127,812 | 7/1992 | Koch et al. ............ 452/125 |
| 5,154,665 | 10/1992 | Hazenbrock .......... 452/160 |
| 5,267,890 | 12/1993 | Koch et al. ............ 452/125 |

*Primary Examiner*—Willis Little
*Attorney, Agent, or Firm*—Jacobson, Price, Holman & Stern

[57] ABSTRACT

A single natural butterfly boneless breast of chicken interconnected by an intermediary portion or central spine is conveyed towards two horizontally oriented saw blades which cut across through approximately 80-95%, preferably 85-90% and most preferably 90% of the width of the single natural butterfly boneless breast to leave an intermediary portion or central spine of width of 5-20% of the single natural butterfly boneless breast at a central portion of the single natural butterfly boneless breast. A single saw blade located downstream from the two horizontally aligned saw blades is aligned perpendicular to the two horizontally aligned saw blades so as to form a longitudinal cut down through the centrally located intermediary portion or spine of the single natural butterfly boneless breast so as to separate the single natural breast into two portions. The single vertically oriented saw blade is positioned so as to not intersect the horizontal cuts made from opposite sides into the single natural butterfly breast by the two horizontally oriented saw blades. The two portions formed by the vertically oriented saw blade each include a cut which extends from one side and 80-95% through the portion so that each portion of breast may be unfolded, as if opening a book, so that the processed breast portion is opened into a butterfly configuration or butterfly cut portion.

10 Claims, 4 Drawing Sheets

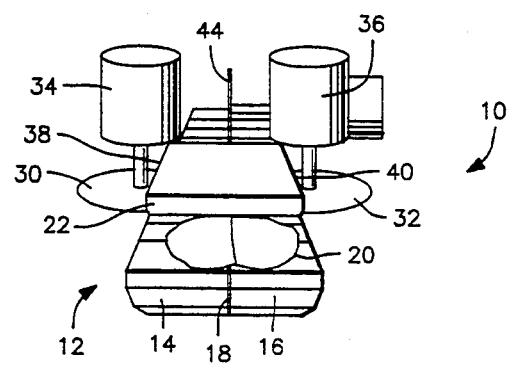
FIG. 1
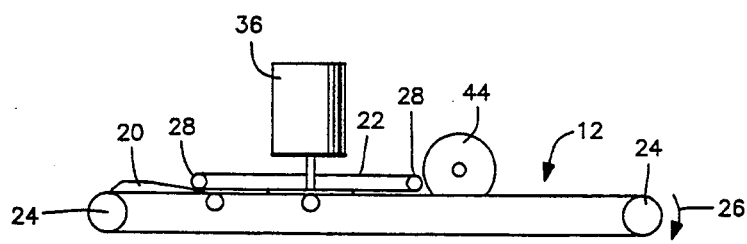
FIG. 2
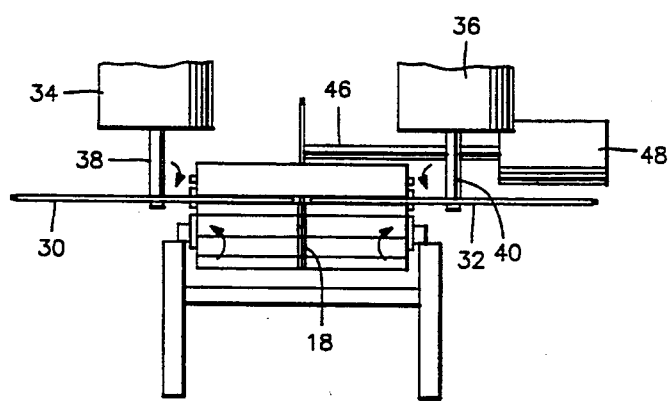
FIG. 3
FIG. 4a   FIG. 4b   FIG. 4c   FIG. 4d
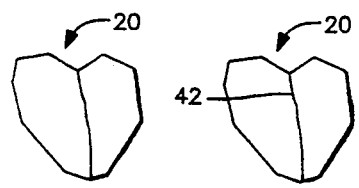
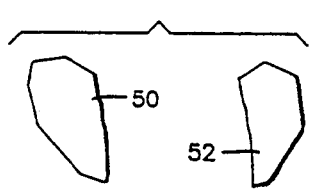
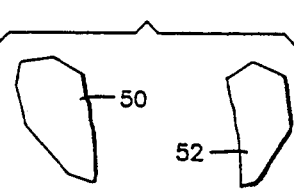
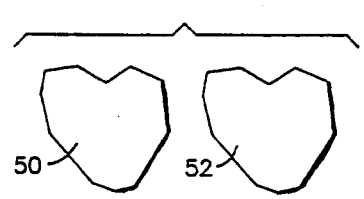

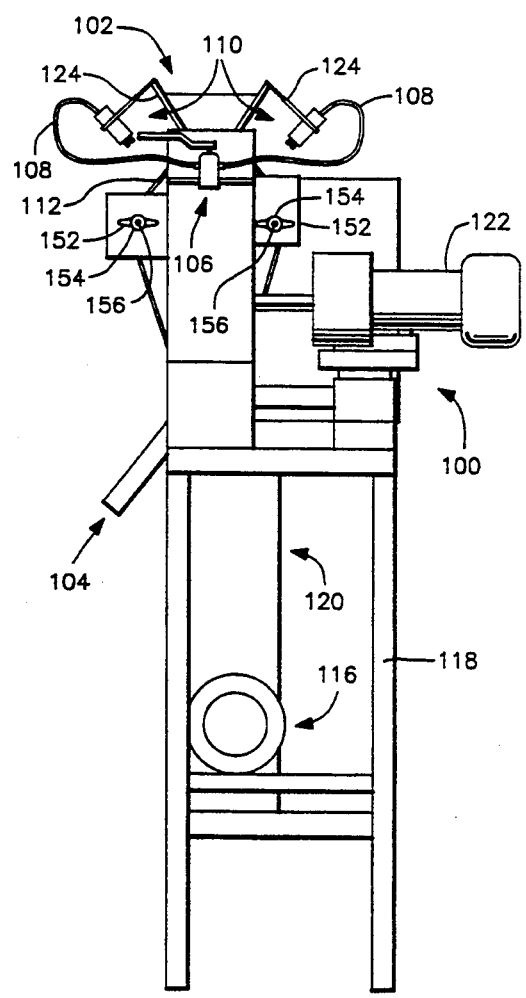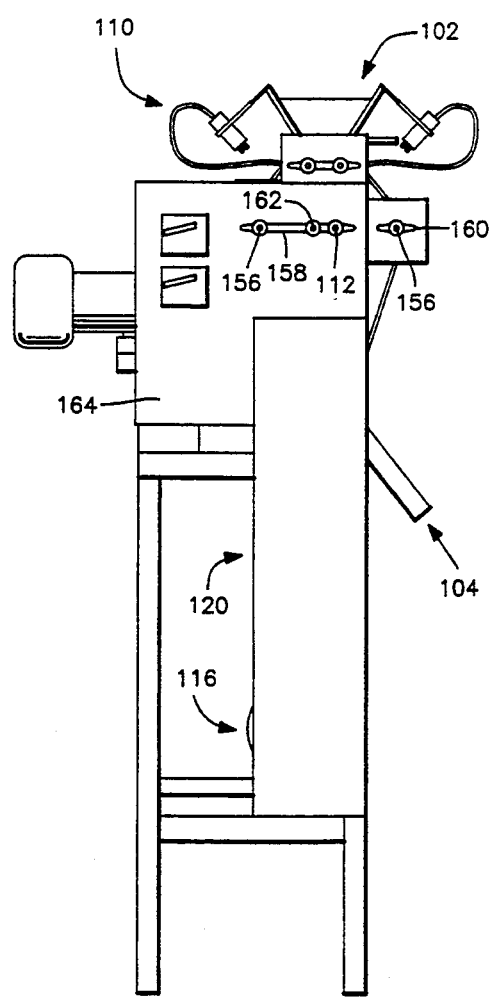

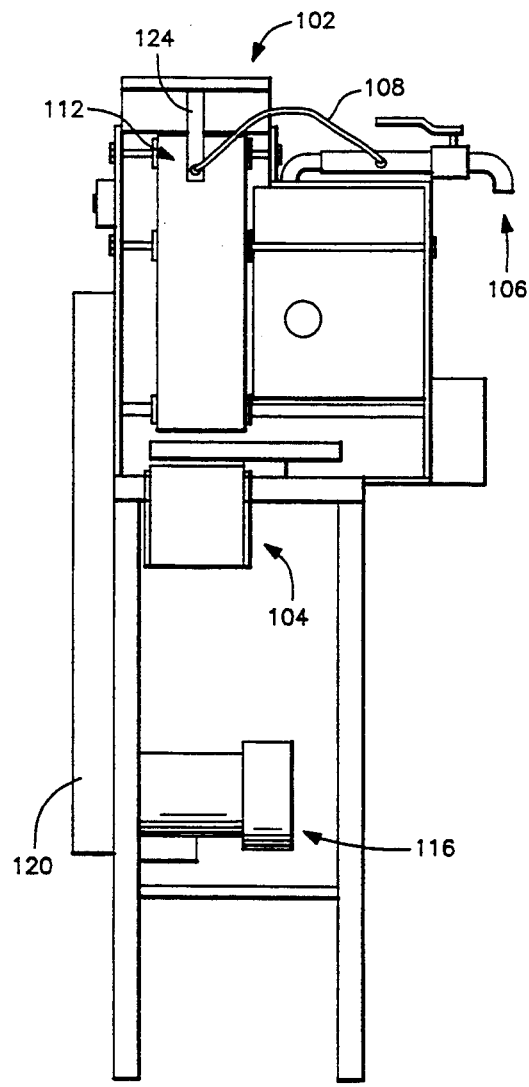
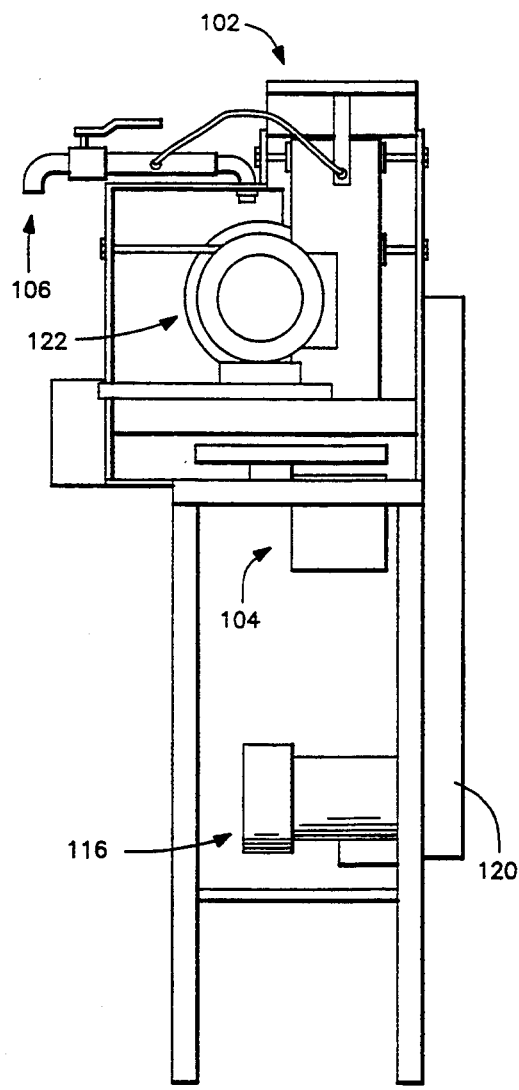

CHICKEN BREAST SLICING METHOD AND APPARATUS

FIELD OF THE INVENTION

This invention relates to the slicing of an approximately ten to sixteen ounce natural butterfly boneless chicken breast into two approximately six-ounce breast portions which each have the appearance of a butterfly cut portion.

BACKGROUND OF THE INVENTION

Due to the cultivating of larger-sized chickens, a concomitant problem has arisen in the portion size allocation for a cut of chicken referred to as a butterfly cut. In a natural butterfly boneless chicken breast, two chicken breast portions are naturally connected by an intermediary portion, such as a common spine as in a book, so that the two breast portions can be splayed open into a butterfly configuration.

With the increasing size of chickens, two naturally interconnected chicken breast portions forming a single butterfly configured portion can reach a weight of approximately ten to sixteen ounces. This size portion is too large for a desired weight of chicken to be served in restaurants or for home consumption in a butterfly configuration.

Accordingly, it may be possible to manually cut a single natural butterfly boneless chicken breast of an approximate weight of ten to sixteen ounces into two pieces and then to cut each of the pieces along a longitudinal axis of the piece so as to lay open the cut pieces to form two butterfly cut portions. Two butterfly cut portions are thereby created manually from a single chicken.

However, this process is time-consuming and labor intensive. To maximize efficiency and lower costs, it is desired that two prepared butterfly cut portions from a single chicken be individually frozen so that a chef at a restaurant may reach into a freezer, obtain a single butterfly cut portion of a size of approximately five to eight ounces, which can immediately be cooked and prepared for serving without time-delaying, labor intensive preparation.

SUMMARY OF THE INVENTION

Accordingly, it is an object of the present invention to prepare two butterfly cut portions from one natural butterfly boneless breast of chicken. The initial weight of the boneless breast of chicken would be approximately ten to sixteen ounces to yield two approximately five to eight ounce portions in a butterfly cut portion configuration which may be quick-frozen and sold to restaurants so that a single five to eight ounce butterfly cut portion may be cooked and prepared for serving.

This object is accomplished by conveying a single natural butterfly boneless breast of chicken interconnected by an intermediary portion or central spine towards two horizontally oriented saw blades which cut across through approximately 80–95%, preferably 85–90% and most preferably 90% of the width of the single natural butterfly boneless breast to leave an intermediary portion or central spine of width of 5–20% of the single natural butterfly boneless breast at a central portion of the single natural butterfly boneless breast.

A single saw blade located downstream from the two horizontally aligned saw blades is aligned perpendicular to the two horizontally aligned saw blades so as to form a longitudinal cut down through the centrally located intermediary portion or spine of the single natural butterfly boneless breast so as to separate the single natural breast into two portions. The single vertically oriented saw blade is positioned so as to not intersect the horizontal cuts made from opposite sides into the single natural butterfly breast by the two horizontally oriented saw blades.

The two portions formed by the vertically oriented saw blade each include a cut which extends from one side and 80–95% through the portion so that each portion of breast may be unfolded, as if opening a book, so that the processed breast portion is opened into a butterfly configuration or butterfly cut portion. Thereby, two butterfly cut portions are produced from a single natural butterfly boneless breast. In serving the butterfly cut portion, it is recommended that the natural exterior surface of the breast portion be displayed upwardly so as to provide the appearance of a whole natural butterfly rather than the prepared butterfly cut chicken breast portion.

In an alternate and preferred embodiment of the invention, one piece of two pieces formed from opposite sides of a single natural butterfly boneless chicken breast is fed vertically into a breast butterfly cutter so that 80–95%, preferably 85–90% and most preferably 90% of the width of the breast piece or half-breast portion is sliced from one edge towards an opposite edge for approximately 80–95% of the width of the breast piece. The breast piece is initially compressed at a saw blade station for insuring a widthwise cut through a middle of the breast piece so that the cut half-breast portion may be opened along a central intermediary portion or central spine to form a butterfly cut portion. The half-breast portion of approximately five to eight ounce weight is thereby transformed into a butterfly cut portion having the appearance of a natural butterfly breast. The natural exterior surface of the butterfly cut breast portion is displayed upwardly so as to provide the appearance of a whole natural butterfly boneless chicken breast.

It is therefore another object of the present invention to provide an apparatus for forming two half-breast portions from a single natural butterfly boneless breast with each half-breast portion being cut from one edge through 80–95% of its width so as to form a butterfly cut portion that resembles a natural butterfly boneless breast.

It is yet another object of the present invention to provide an apparatus for forming two half-breast portions from a single natural butterfly boneless breast with each half-breast portion being cut from one edge through 80–95% of its width so as to form a butterfly cut portion that resembles a natural butterfly boneless breast with the single natural butterfly boneless breast being compressed between two conveyor belts for slicing from opposite edges.

It is still yet another object of the present invention to provide an apparatus for forming each half-breast portion of a single natural butterfly boneless breast with a cut from one edge through 80–95% of its width so as to form a butterfly cut portion that resembles a natural butterfly boneless breast.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 1 is a schematic perspective view of a horizontal chicken breast slicing machine.

FIG. 2 is a schematic side view of the horizontal chicken breast slicing machine.

FIG. 3 is an enlarged schematic front view of the horizontal chicken breast slicing machine.

FIG. 4A illustrates a single whole natural butterfly boneless breast.

FIG. 4B illustrates a single whole natural butterfly boneless breast having been slit from opposite edges by saw blades.

FIG. 4C illustrates a single whole natural butterfly boneless breast split into two pieces after having been sliced from opposite edges.

FIG. 4D illustrates two pieces of a single whole natural butterfly boneless breast as shown in FIG. 4C and which have been unfolded along a central spine to produce two butterfly cut portions.

FIG. 5 is a rear view of a vertical breast butterfly cutter.

FIG. 6 is a front view of the vertical breast butterfly cutter.

FIG. 7 is a right side view of the vertical breast butterfly cutter.

FIG. 8 is a left side view of the vertical breast butterfly cutter.

DETAILED DESCRIPTION OF THE PREFERRED EMBODIMENTS

Figure 9:
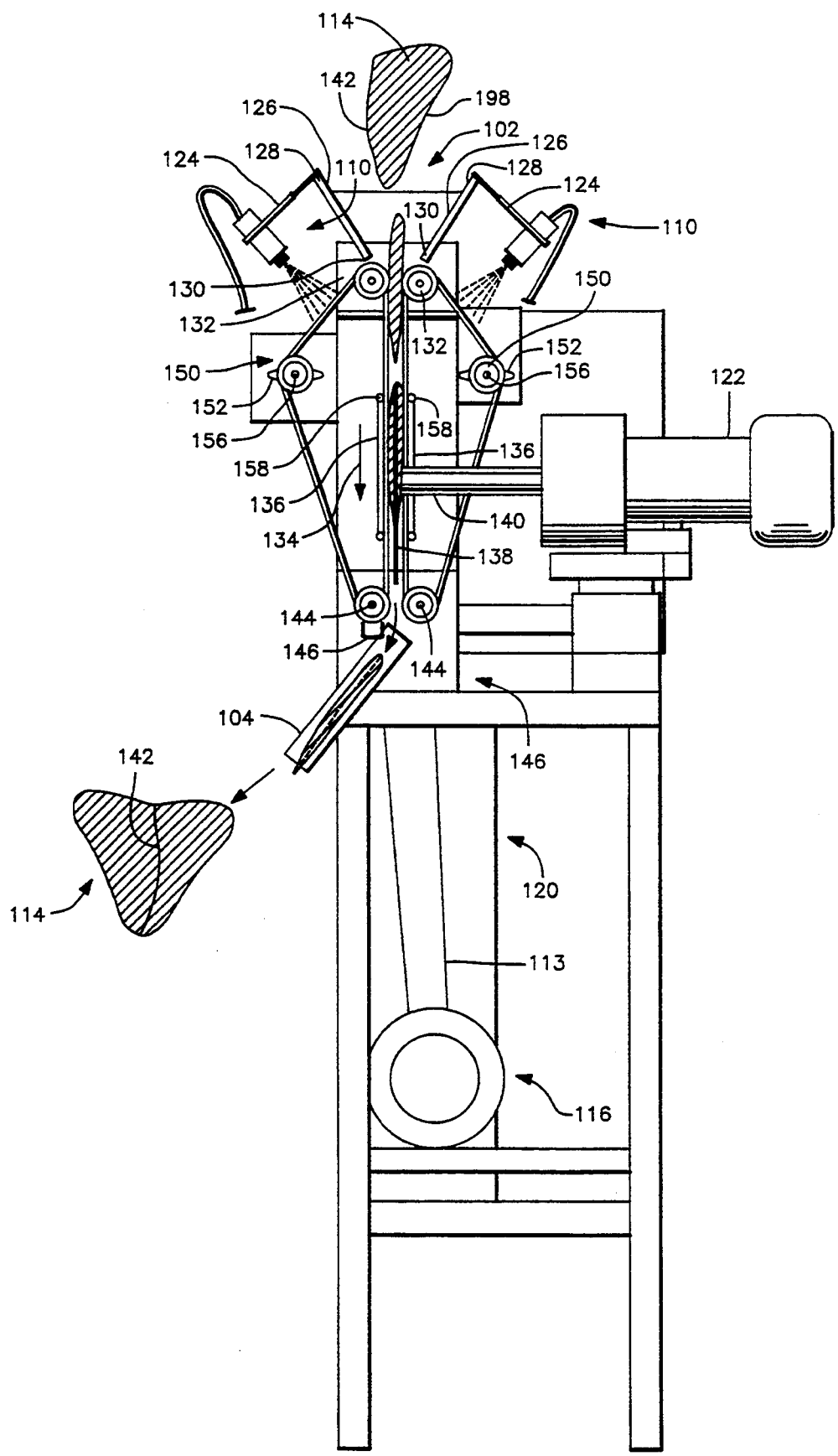
FIG. 9 is a cut-away view showing the cutting process for forming a butterfly cut portion by the vertical breast butterfly cutter.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1 through 4, in particular, a chicken breast slicing machine embodying the teachings of the subject invention is generally designated as 10. With reference to its orientation in FIG. 1, the horizontal chicken breast slicing machine includes a lower conveyor belt 12 divided into sections 14 and 16 and including a central located recessed slot 18. In FIG. 1, a single natural butterfly boneless chicken breast 20 is depicted being conveyed horizontally by the lower conveyor belt 12. The chicken breast 20 proceeds along the lower conveyor belt 12 towards engagement with an upper conveyor belt 22 by the rotation of the gears 24 of the lower conveyor belt 12 in the direction of arrow 26.

Similar to lower conveyor belt 12 upper conveyor belt 22 is chain driven about gears 28 by a motor (not shown) so as to have a lower portion of the upper belt 22 and an upper portion of lower belt 12 engage the chicken breast 20 as moved towards a plurality of saw blades. The spacing between the lower surface of upper belt 22 and the upper surface of lower belt 12 is slightly less than a thickness of a typical natural butterfly boneless breast so as to compress the chicken breast 20 as it proceeds towards the saw blades.

As shown in FIGS. 1 and 3, two horizontally oriented saw blades 30, 32 are respectively driven by motors 34, 36 as interconnected by drive shafts 38, 40, respectively. An outer periphery of the saw blades 30 and 32 is located adjacent to the slot 18 defined in the lower conveyor belt 12.

As a single natural butterfly boneless breast 20 moves along the conveyor towards the saw blades 30 and 32, which are rotating in a direction towards the approaching chicken breast 20, the saw blades make an incision in the sides of the chicken breast 20 from its outer peripheral edges towards a central intermediary section or central spine 42 of the chicken breast 20. The cuts from the outer peripheral edges of the chicken breast 20 sever approximately 80–95% of the chicken breast leaving intact only a central intermediary section or central spine 42. The saw blades 30, 32 are positioned to cut centrally at an approximate midpoint between the uppermost and lowermost surfaces of the thickness of the chicken breast from opposite sides.

After the chicken breast 20 is sliced from opposite peripheral edges towards its central intermediary section or central spine 42, the chicken breast, in the condition shown in FIG. 4B, leaves the gap between the upper conveyor belt 22 and the lower conveyor belt 12. The chicken breast then encounters a vertically oriented saw blade 44 as driven by a drive shaft 46 of motor 48.

The vertically oriented saw blade 44 slices the chicken breast 20 down the central intermediary section 42 of the chicken breast 20 without intersecting the cuts made from the opposite side edges into the chicken breast 20 by the saw blades 30, 32. The vertically oriented saw blade 44 is accommodated within the recessed slot 18 of the lower conveyor belt 12 so as to thoroughly cut through the central intermediary section 42 of the chicken breast 20. As a result, the single natural butterfly boneless breast 20 is divided into two pieces 50, 52 as shown in FIG. 4C.

The two breast pieces 50, 52 then move past from between the two conveyor belts 12 and 22 and are moved downstream along lower conveyor belt 12. Since the side horizontal cuts by saw blades 30, 32 only cut through between 80–95%, preferably 85–90% and most preferably 90% of the chicken breast 20, each breast piece 50, 52 may be opened like a book along the portion remaining in each piece 50, 52 of central intermediary section or central spine 42 which has remained intact, after passing through the three saw blades, to form two separate butterfly cut portions as shown in FIG. 4D. The splayed open pieces 50, 52 are shown in FIG. 4D.

Therefore, by starting with an approximately ten to sixteen ounce portion of a single natural butterfly boneless chicken breast 20, the product formed by the apparatus 10 of the present invention produces two butterfly cut portions of approximately five to eight ounce by weight each. By this method, an automated production of individual butterfly cut portions can be mass-produced with two butterfly cut portions produced from a single natural butterfly for each chicken. It is therefore possible to raise large chickens and maximize portion control to accommodate the demands of the industry to produce a butterfly cut portion of a desired size that can be obtained while providing the appearance only previously obtainable from a single natural butterfly boneless chicken breast.

In FIGS. 5 through 9, an alternate embodiment of the present invention is shown. In these figures, a single natural butterfly boneless chicken breast has previously been divided into two portions.

In FIG. 5, one portion 114 of the two portions of the natural butterfly boneless chicken breast is fed into the breast butterfly cutter apparatus 100 by introduction into feed hopper 102. The portion fed into the feed hopper is delivered from the meat exit chute 104 having been sliced from one side edge towards an opposite side edge approximately 80–95% through, preferably 85–90% through and most preferably 90% through so as to leave one side edge of the portion intact and the remainder of the portion divided in two. The portion exiting the meat exit chute 104 can be laid open to form a butterfly cut portion as is shown in FIG. 4D, it being understood that the machine 100 will produce only a single butterfly cut portion from a portion forming one-half of a natural boneless chicken breast.

A fresh-water input 106, as shown in FIG. 7, includes two tap lines 108 connected to spray nozzles 110 for washing two food grade conveyor belts 112. The belts 112 convey one portion 114 of the two portions formed from a single natural butterfly boneless chicken breast.

A motor 116 for driving the conveyor belts 112 is mounted on a frame 118 of the machine 100. A stainless steel machine guard 20 is secured to the frame 118 to protect an operator of the machine from the drive train 113 which drives the belts 112. Projecting laterally from the machine frame 118 is a drive motor 122 which will be explained in greater detail with reference to FIG. 9.

In FIGS. 7 and 8, opposite sides of the machine are shown. In FIGS. 7 and 8, brackets 124 support the spray nozzles 110 for contacting the conveyor belts 112 so as to continuously clean the belts 112 prior to conveying a chicken portion 114 to a saw blade.

In FIG. 9, one portion 114 of two portions obtained from a single natural butterfly boneless breast is fed into the inlet hopper 102 with the edge 142 of the portion 114 extending parallel to the direction of travel of the portion 114 through the machine 100. The hopper 102 includes converging side walls 126, which at their upper ends 128 are connected to brackets 124 for support of spray belt washers 110. The bottom ends 130 of the side walls 126 approach belt rollers 132, made of stainless steel, about which conveyor belts 112 are conveyed.

Between the two belts 112, a space is defined for receipt of chicken portion 114. The conveyor belts 112 convey the portion 114 downwardly in the gap formed between the belts in the direction of arrow 134. Approximately at the midpoint of the downward conveyance path of the portion 114 are located two opposed pressure plates 136, made of stainless steel, which force the conveyor belts 112 closer together so as to further compress the chicken half-breast portion 114 being conveyed vertically downwardly.

In the gap formed between the pressure plates 136 is a vertically oriented saw blade 138 driven by shaft 140 as rotated by saw drive motor 122. The saw blade 138 cuts from one peripheral side edge of the portion 114 towards an opposite peripheral side edge but only 80–95% of the way through the portion 114. The cut is preferably 85–90% through the portion 114 and more preferably 90% through. This cut leaves one side edge 142 of portion 114 intact.

The portion 114 then continues travelling downwardly past belt rollers 144 and water gutters 146 until reaching exit chute 104 made of stainless steel. As shown in dotted lines on the portion 114 contained on the exit chute 104 in FIG. 9, a partially-extending through cut of the portion 114 extends from side 148 towards side edge 142, but not cutting through side edge 142. This allows the portion 114 as shown in the position exiting from the exit chute 104 as being opened alongside edge 142 into a butterfly cut portion made from a single half-breast portion 114. Therefore, from a single natural butterfly, two butterfly cut portions are produced.

The pressure exerted on the half-breast portions 114 is controlled by adjusting the distance between the two conveyor belts 112 by adjusting the position of all of the sets of belt rollers. As shown in FIG. 9, the belt rollers 150 are located within groove 152 which is shown on the outside of the machine in FIG. 5. By loosening nuts 154 the shafts 156 of the belt rollers 150 are slidable within groove 152 to adjust the tension on the conveyor belts 112 so that the other belt rollers may be moved.

In FIG. 6, the opposite end of shafts 156 are shown being slidably mounted within slots 158 and 160. The upper ends of shafts 162 of the pressure plates 136 are also slidable within slot 158. The shafts for the lower ends of the pressure plates 136 are similarly slidably mounted in the side wall 164 of the machine 100 as blocked from view by the machine guard 120.

Also not shown is the sliding arrangement for the shafts of belt rollers 144 which are also slidably mounted in the side wall 164 of the machine 100. Therefore, the tension on the belt rollers 112 as well as the gap between the rollers and pressure plates are adjustable so that the pressure to be applied by pressure plates 136 is adjustable.

Having described the invention, many modifications thereto will become apparent to those skilled in the art to which it pertains without deviation from the spirit of the invention as defined by the scope of the appended claims.

We claim:

1. A chicken breast slicing means comprising:

two conveyor belts for conveying a natural butterfly chicken breast in a predetermined direction and for compressing the natural butterfly chicken breast, two opposed saw blade means positioned between said two conveyor belts and defining a gap therebetween for initially cutting through 80 to 95% of the natural butterfly chicken breast from opposite side edges as the natural butterfly chicken breast is conveyed to said saw blades by said two conveyor belts so as to leave intact a central intermediary portion of 5 to 20% of the natural butterfly chicken breast, and a third saw blade means positioned perpendicular to said two opposed saw blades and extending into a plane of said gap between said two opposed saw blade means, said third saw blade means being located downstream along said two conveyor belts from said two opposed blade means for subsequently severing said natural butterfly chicken breast along said central intermediary portion after passing through said two opposed saw blade means so as to form two chicken breast portions which are foldable along a respective portion of said central intermediary portion to form two chicken breast butterfly cut portions.

2. A chicken breast slicing means according to claim 1, wherein said two saw blade means cut 85 to 90% of the natural butterfly chicken breast.

3. A chicken breast slicing means according to claim 2, wherein said two saw blade means cut 90% of the natural butterfly chicken breast.

4. A method of producing two butterfly cut chicken breast portions from a single natural butterfly chicken breast, said method comprising:
   obtaining a natural butterfly chicken breast from a chicken carcass,
   placing the natural butterfly chicken breast on a conveyor,
   slicing the natural butterfly chicken breast 80 to 95% from at least one peripheral side edge of the natural butterfly chicken breast towards an opposite peripheral side edge of the natural butterfly chicken breast so as to leave intact a spine portion including 5 to 20% of the natural butterfly chicken breast, and
   folding the cut natural butterfly chicken breast along said spine portion.

5. A method of producing two butterfly cut chicken breast portions from a single natural butterfly chicken breast according to claim 4, wherein the natural butterfly chicken breast is cut into two portions.

6. A method of producing two butterfly cut chicken breast portions from a single natural butterfly chicken breast according to claim 4, wherein said spine portion is centrally located on the natural butterfly chicken breast.

7. A method of producing two butterfly cut chicken breast portions from a single natural butterfly chicken breast according to claim 4, wherein said natural butterfly chicken breast is compressed during slicing.

8. A method of producing a butterfly cut chicken breast portion from a chicken breast portion, said method comprising:
   obtaining a chicken breast portion from a chicken carcass,
   placing the chicken breast portion on a conveyor,
   slicing the chicken breast on the conveyor 80 to 95% from one peripheral side edge of the chicken breast portion towards an opposite peripheral side edge of the chicken breast portion so as to leave intact a spine portion including 5 to 20% of the chicken breast portion, and
   laying open the cut butterfly chicken breast portion along said spine portion.

9. A method of producing two butterfly cut chicken breast portions from a single natural butterfly chicken breast, said method comprising:
   obtaining a natural butterfly chicken breast from a chicken carcass,
   placing the natural butterfly chicken breast on a conveyor,
   slicing the natural butterfly chicken breast on the conveyor 80 to 95% from opposite peripheral side edges of the natural butterfly chicken breast towards a central portion of the natural butterfly chicken breast so as to leave intact a spine portion including 5 to 20% of the natural butterfly chicken breast, and
   cutting the natural butterfly chicken breast along said spine portion to form two butterfly chicken breast portions.

10. A method of producing two butterfly cut chicken breast portions from a single natural butterfly chicken breast, said method comprising:
    obtaining a natural butterfly chicken breast from a chicken carcass,
    placing the natural butterfly chicken breast on a conveyor,
    slicing the natural butterfly chicken breast on the conveyor 80 to 95% from at least one peripheral side edge of the natural butterfly chicken breast towards an opposite peripheral side edge of the natural butterfly chicken breast so as to leave intact a spine portion including 5 to 20% of the natural butterfly chicken breast, and
    laying open the cut natural butterfly chicken breast along said spine portion.

* * * * *